United States Patent [19]

Heinzelmann

[11] Patent Number: 5,257,407
[45] Date of Patent: Oct. 26, 1993

[54] AUTOMATIC ANTENNA COUPLER FAULT DETECTOR AND INDICATOR

[75] Inventor: David W. Heinzelmann, Bedford, Tex.

[73] Assignee: Motorola, Inc., Schaumburg, Ill.

[21] Appl. No.: 585,749

[22] Filed: Sep. 20, 1990

[51] Int. Cl.[5] .......................................... H04B 17/00
[52] U.S. Cl. ................... 455/67.1; 455/67.7; 455/226.1; 455/281; 455/292
[58] Field of Search ............ 455/67.1, 67.7, 80, 455/82, 115, 117, 129, 226.1–226.4, 269, 280–282, 289, 292, 293; 324/538; 340/652, 664; 343/894, 905, 906

[56] References Cited

U.S. PATENT DOCUMENTS

| | | | |
|---|---|---|---|
| 4,612,669 | 9/1986 | Nossen | 455/129 |
| 4,841,281 | 6/1989 | Melvin, Jr. | 340/664 |
| 4,964,065 | 10/1990 | Hicks et al. | 455/67.7 |

FOREIGN PATENT DOCUMENTS 0205634  8/1989  Japan .................. 455/67.1

Primary Examiner—Reinhard J. Eisenzopf
Assistant Examiner—Chi Pham
Attorney, Agent, or Firm—M. Mansour Ghomeshi

[57] ABSTRACT

A communication system 100 comprising a dispatch sub-system 100A, a plurality of transmitters 100B, and a plurality of mobile transceivers 100C is disclosed. An antenna coupler 410 and a location sensor 414 are coupled to one another via a coax cable 412. The bias current to the coupler is supplied by the location sensor 414 via the resistor 406. A detector 200 measures the voltage across the resistor 406 which is relative to the current flowing in to the antenna coupler 410. The detector 200 compares the measured voltage via comparators 218 and 238 and determines if the measured voltage is beyond a certain boundary. The NOR gate 244 routes the comparison result to a MPU 250. The MPU 250 processes the result and transmits a signal to a base station 104 via the mobile transceiver 118. The base station 104 decodes the received signal and presents it to a dispatch center 106. A screen display 600 of a terminal at the dispatch center 106 has a dedicated column 602 for the presentation of the coupling status of the antenna coupler 410.

6 Claims, 5 Drawing Sheets

FIG. 6

| F.ID | --ID-- | ALERTS | --CLASS-- | -STATUS- | MESSAGE- | LO | PE | PP | CPLST |
|------|--------|--------|-----------|----------|----------|----|----|----|-------|
| 0028 | AB-434 | E... | ..3.5.7. | AVAILABL | MSG-2... | Y | Y | Y | GOOD |
| 0080 | ADAM12 | .S. | ...56... | EN ROUTE | MSG-3... | N | Y | Y | GOOD |
| 0199 | 124RTE | ... | ..2.5... | AT SCENE | MSG-3... | Y | N | Y | GOOD |
| 0328 | 4 SUPV | ... | ...3...8 | | | Y | Y | N | N/A |
| 0361 | 132RTE | ..N | ..3.56.. | LNCH-BRK | MSG-1... | Y | Y | Y | FAIL |
| 0528 | AB-437 | ... | ..3.5.7. | AVAILABL | CALL ME | Y | Y | Y | GOOD |
| 0780 | ADAM14 | .S. | ...56... | EN ROUTE | MSG-3... | Y | Y | Y | GOOD |
| 0799 | 154RTE | .P. | ..2.5... | AT SCENE | MSG-3... | Y | Y | Y | GOOD |
| 0828 | 2 SUPV | ... | ...3...8 | | | Y | N | N | N/A |
| 0861 | 158RTE | ..N | ..3.56.. | LNCH-BRK | MSG-1... | Y | Y | Y | GOOD |
| 1028 | AB-431 | ... | ...3...8 | AVAILABL | MSG-2... | Y | Y | Y | GOOD |
| 1080 | ADAM10 | .S. | ...567.. | EN ROUTE | MSG-3... | Y | Y | Y | GOOD |
| 1189 | 110RTE | .P. | ..2.5... | AT SCENE | CALL ME | Y | Y | Y | GOOD |
| 1228 | 7 SUPV | ... | ...3...8 | ........ | ........ | Y | N | N | GOOD |

COMMAND: DPVD  12:45
DISPLAY: LIST VEHICLE DATA  31-AUG-87

****

| | F.ID | -CLASS- | -LOCATION- | -BLKS- | -DIR- | TIME |
|---|------|---------|------------|--------|-------|------|
| ON RADIO: | 0361 | ..3...8 | EUCLID AVE & IL-83 | .. 3E | W | 0 |

EMERGENCY-1    PRIORITY/CL2-3    STOPPED-3    NO REPLY-2

600

602

AUTOMATIC ANTENNA COUPLER FAULT DETECTOR AND INDICATOR

TECHNICAL FIELD

This invention relates generally to antennas and more specifically to antennas using transformation devices and is particularly directed towards antennas requiring active couplers.

BACKGROUND

RF communications systems are well known in the art. In many such systems, as in mobile applications, vehicles are equipped with mobile transceivers that allow their operators to communicate with one or more base stations or other similarly equipped vehicles in the system. These vehicles are often equipped with an automatic vehicle location system. One such vehicle location system is Long Range Navigation (LORAN-C), which is a low frequency (100 KHz) system originally intended to provide navigation capability to marine craft operating in the coastal waters of the continental United States and on the great lakes.

The LORAN-C system utilizes a group of stations transmitting synchronized pulse signals at a common repetition rate. These signals are received and time stamped by the vehicle's LORAN-C receiver. Utilizing the time difference between the receipt of these signals the receiver determines the location of the vehicles in which it is installed. This location information is subsequently routed to the mobile transceiver for transmission to a dispatch center, where location information of all vehicles in a fleet are processed.

Since the number of LORAN-C transmitters are limited and are sparsely located in the AVL system, the incoming signals at the vehicle's antenna are of very low levels (typically an average signal to noise ration of −15 to −10 dB) and must be effectively coupled to the receiver's input port. Furthermore these antennas must be more accurately designed and installed in order to meet the overall system requirements. A quarter wavelength antenna at 100 KHz is 750 meters in length. Such an antenna is physically impossible to install on a vehicle. Therefore an "E-FIELD PROBE" of a typical length of 0.5 meters is used. The effective impedance of this antenna is approximately 250 K$\Omega$. Thus an active coupler is required to provide; impedance matching to a 50$\Omega$ coax cable, amplification of the received signal, and pre-selectivity of the received signal.

The objective of AVL systems is multifold. One is to determine the general location of a vehicle in order to identify the closest repeater to be used in communications with that vehicle. Another is, to closely monitor the routes travelled by vehicles in order to verify adherence to schedules. This monitoring of travel routes is not well received by the operators of vehicles in an AVL system and a number of different approaches have been employed by operators of such vehicles to falsify the location information sent in by the mobile radio. The easiest and most detrimental deactivation is antenna sabotage. The usual method of sabotage is to loosen the antenna coupler. This allows the AVL system to respond with ID and data other than valid vehicle location rendering the system useless.

A need therefore exists for a means to evaluate the coupling status of antennas in communication systems such as AVL systems and report this status to a base so that remedial action may be taken. Such evaluation and indication of the coupling status of antennas would greatly enhance communication systems' throughout and effectiveness. This invention provides such means and along with it other features valuable to users of such systems.

SUMMARY OF THE INVENTION

Briefly, according to the invention, a communications system having two circuits coupled to one another is disclosed. One of the circuits receives a bias current from a supply source. The communications system includes additional circuits for measuring and analyzing the bias current flow to detect any decoupling of the two circuits. Any detected decoupling is indicated to the user by an indicator circuit included in the communications system.

Other aspects of the invention cover a communications system comprising of a multiple of fixed transmitters and mobile receivers. The communications system further includes a dispatch center having a base station for transmitting and receiving voice and data communications to and from a multiple of mobile transceivers. The antennas for the mobile receivers are coupled to their respective receivers via active antenna couplers which are biased by supply currents and can be sourced by the same receivers. A circuit in the mobile receiver monitors the flow of this bias current and determines the status of the antenna. The fixed transmitters transmit signals with pre-determined time intervals. Each of the mobile receivers receives these signals and determines its respective location. The status of the antenna along with location information are transmitted to the dispatch center via the mobile transceivers where they can be reviewed by an attendant.

BRIEF DESCRIPTION OF THE DRAWINGS

FIG. 6 shows the screen display of a computer monitor at a dispatch center.

DETAILED DESCRIPTION OF THE PREFERRED EMBODIMENT

Figure 1:
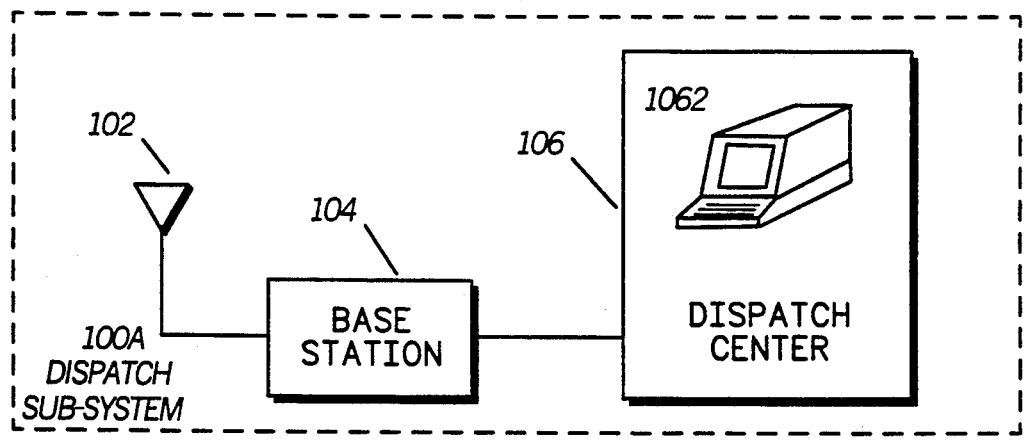
FIG. 1 shows a block diagram comprising the essentials of a communications system in accordance with the principles of the present invention.
Figure 1:
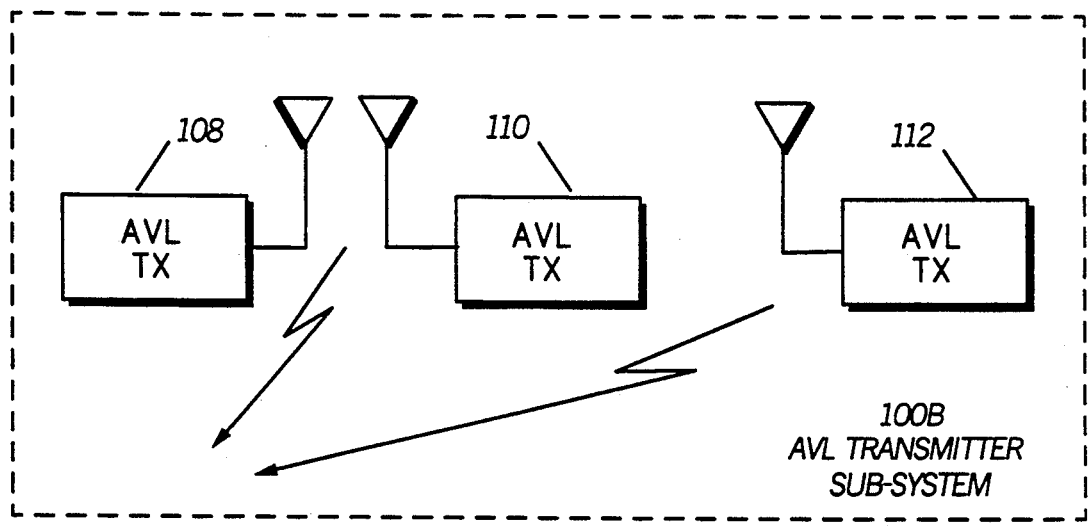
Figure 1:
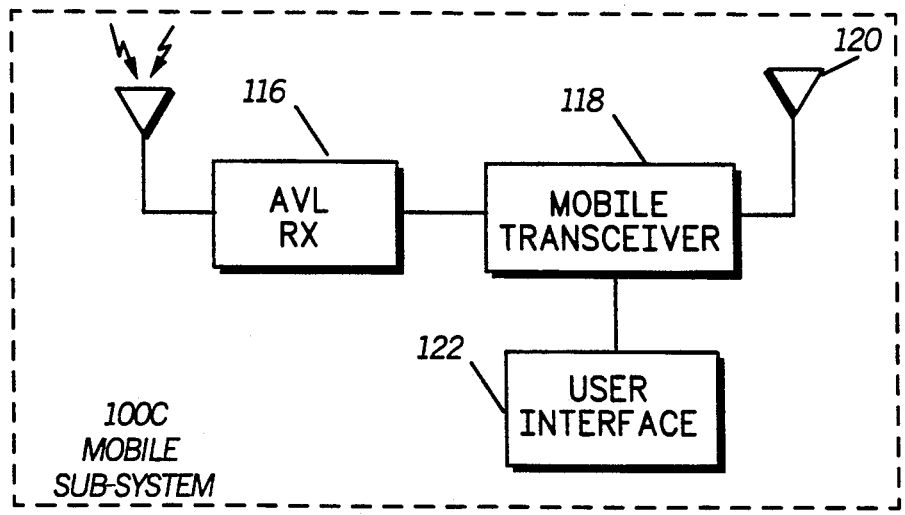

Referring to FIG. 1, a communication system 100 is shown in accordance with the present invention. The communication system 100 includes three major sub-systems; dispatch sub-system 100A, AVL transmitter sub-system 100B, and mobile sub-system 100C. The combination of these three sub-systems forms an infrastructure that has applications in vehicle tracking and communications. Each of the fore-mentioned sub-systems is comprised of several blocks described below.

The dispatch sub-system 100A includes a dispatch center 106 which communicates with a base station 104, using medias known in the art such as: dedicated cable lines, micro wave, or telephone lines. Coupled to the base station 104 is an antenna 102 for receiving and transmitting radio wave signals. The dispatch center 106 includes among other equipments one or more computer monitors 1062, which provide indicator means to indicate the coupling status of specific circuits as well as other activities of the communication system 100.

The AVL transmitter sub-system 100B comprises a plurality of AVL transmitters 108, 110, and 112. The transmitters 108, 110, and 112 may be LORAN-C or any other location transmitters such as those used in the Global Positioning System. The transmitters 108, 110, and 112 are dispersed in a geographical area and transmit synchronized pulse signals at a common repetition rate.

The mobile sub-system 100C shown here is representing one of several vehicles in the communication system 100. The mobile sub-system 100C comprises an AVL receiver 116 with its associated antenna 114, a mobile transceiver 118 with its associated antenna 120, and a user interface 122. The mobile transceiver 118 includes transmitter and receiver circuits for transmitting and receiving data and voice communication signals. The mobile transceiver 118 further includes control circuits for controlling the flow of information. The mobile transceiver 118 transmits and receives voice and data communication signals to and from the dispatch sub-system 100A and other mobile transceivers via its antenna 120. The received signals at the antenna 120 are routed to the mobile transceiver 118 where they are decoded and submitted to the user interface 122 for presentation to the mobile user. Similarly user requests are routed from the user interface 122 to the mobile transceiver 118 for transmission via antenna 120.

Figure 4:
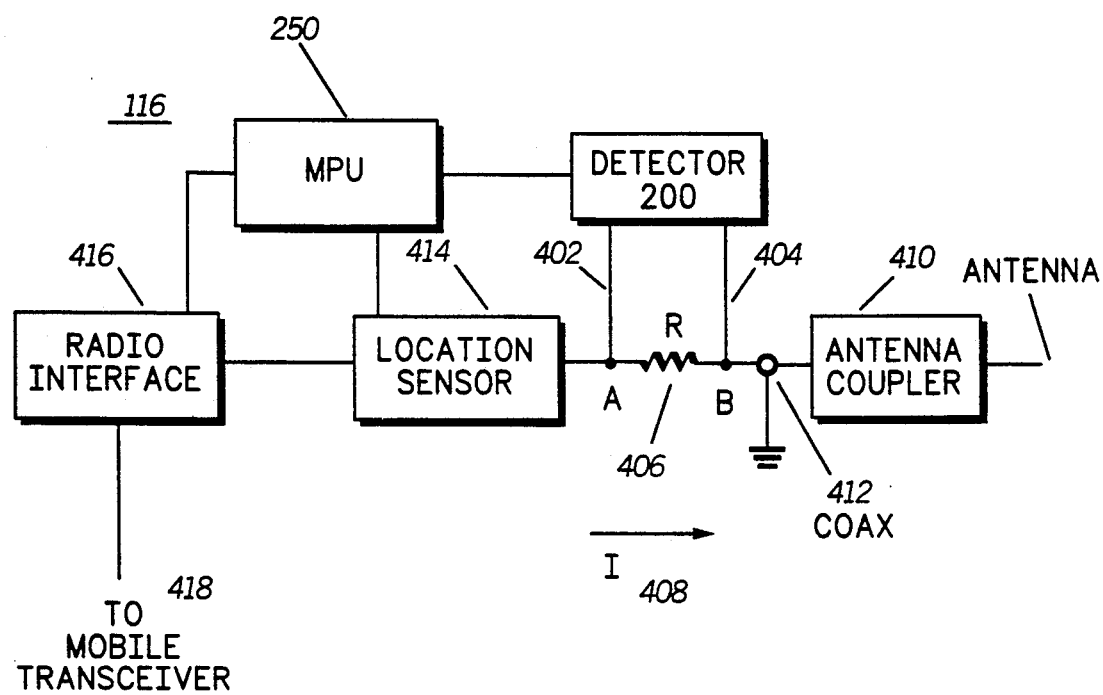
FIG. 4 is a circuit diagram of a receiver showing a detector, an antenna coupler, and other associated circuits in accordance with the present invention.

Referring now to FIG. 4, a block diagram of the AVL receiver 110 is shown. The AVL receiver 116 includes an active transformation device such as an antenna coupler 410 representing a first circuit coupled to a location sensor 414, which represents a second circuit of the communication system 100. The AVL receiver 116 further includes a decoder 200, a current to voltage converter represented by a resistor 406, the MPU 250, and a radio interface 416. The output of the radio interface 416 is coupled to the input of the mobile transceiver 118. The antenna 114 receives the pulse signals from the AVL transmitter sub-system 100B and routes them to the antenna coupler 410. Since these signals are of extremely low levels, pre-amplification is required at the antenna interface along with pre-selectivity prior to transmission on a coax cable 412 to the location sensor 414.

Figure 5:
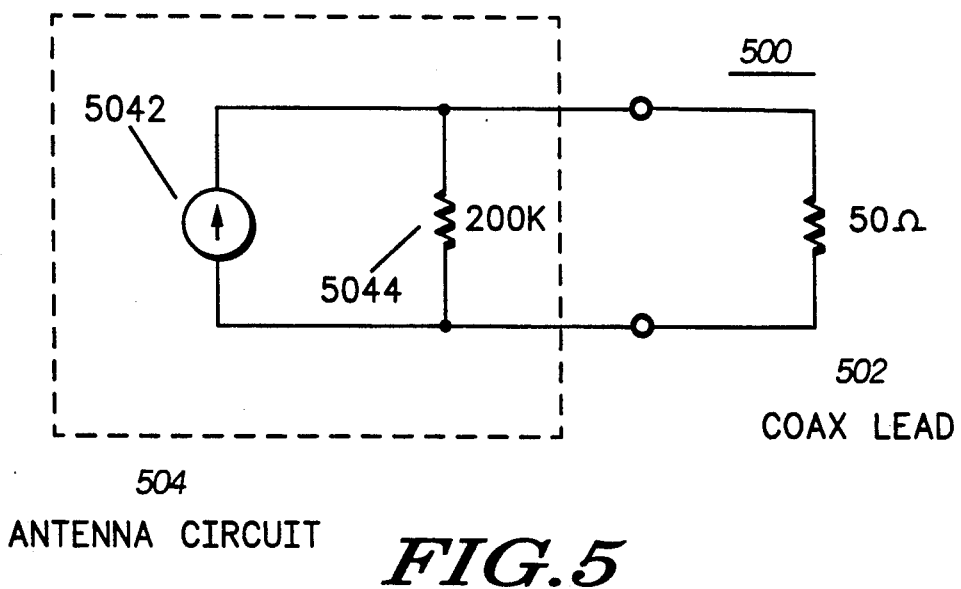
FIG. 5 shows an equivalent circuit of the direct coupling of an antenna to a coax cable.

In the case of LORAN-C which operates at 100 KHz, the antenna is at a high impedance ($\approx 200$ K$\Omega$) and the coax is at a low impedance (50$\Omega$). FIG. 5 shows an equivalent circuit of this impedance mismatch. The antenna 114 is represented by a current source 5042 having an output impedance represented by a resistor 5044. The current source 1142 is coupled to a coax cable being represented by the resistor 502. It is due to this expressed mismatch that an impedance transformation device is needed to couple the antenna 114 and the coax cable 412. This impedance transformation along with some amplification and filtering is accomplished by the active coupler 410 which is directly coupled to the antenna 114 in a LORAN-C application.

The bias current to the antenna coupler 410 is generated on the AVL receiver 116 and is routed from the location sensor 414 via resistor 406 and the coax cable 412. Resistor 406 is used to convert the current 408 flowing into the antenna coupler 410 to a relative voltage. This voltage is used by the detector 200 in measuring the bias current 408 of the coupler 410. Two points of contact A 402 and B 404 are used as the interface between the detector 200 and the resistor 406. The detector 200 compares and determines if the current supplied to the antenna coupler 410 is within a predetermined boundaries for determining if any decoupling of the antenna coupler 410 has occurred. The value of the resistor 406 determines the permissible voltage boundaries relative to the bias current flowing into the antenna coupler 410. In this embodiment the resistor 406 has a 51$\Omega$ value which sets the permissible boundaries at:

$$0.75 \text{ v} < V_A - V_B < 1.30 \text{ v}.$$

Signals from the AVL transmitter sub-system 100B are received by the antenna 114 and are coupled to the location sensor 414 by the antenna coupler 410 via the coax cable 412. The location sensor 414 amplifies the received signals which are subsequently decoded and converted into spatial coordinates. In the case of LORAN-C they are latitude, longitude, and velocity. This coordinate information along with signal quality and the coupling status of the antenna 114 are formatted into a binary data packet (RS-232, MDC, ...) for sending to the mobile transceiver 118 via the radio interface 416.

Figure 3:
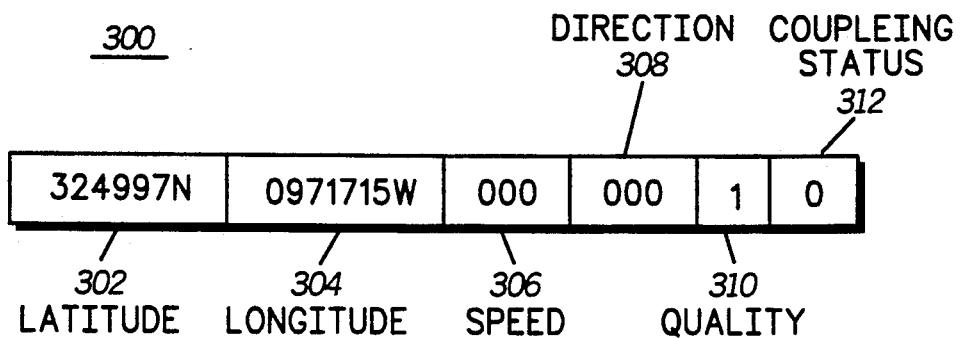
FIG. 3 shows the contents of a data packet used in communicating the coupling status of the antenna.

FIG. 3 shows the assignment of bits in a data packet 300 used in a LORAN-C system. The block 302 contains seven bits representing latitude. The second block 304 carries the longitude information. Information containing speed, direction, and signal quality occupy the blocks 306, 308, and 310. Block 312 flags the coupling status of the antenna coupler 410. The block 312 may be a single bit driven high or low at a micro-processor unit (MPU) 250 as the coupling status of the antenna coupler 410 changes.

The data packet 300 arrives at the mobile transceiver 118 from the AVL receiver 116 at a pre-defined rate. This data packet 300 is processed and filtered by the mobile transceiver 118 and transmitted to the dispatch sub-system 100A via the antenna 120. The dispatch sub-system 100A receives and decodes the data packet 300 via the antenna 102 and the base station 104. The decoded data is then routed to the dispatch center 106 for presentation to the dispatch attendant on a monitor such as those used with computers.

An example of the screen display 600 of a monitor is shown in FIG. 6. The display 600 contains various fields for presenting to the dispatch attendant the ID and location information of vehicles in a fleet. Other fields are dedicated to such information as sign up time, log off time, emergencies, and channel activities. One additional field CPL ST 602 is assigned on the display for the indication of the coupling status of the antenna 114 or any other antenna in the communication system 100.

Figure 2:
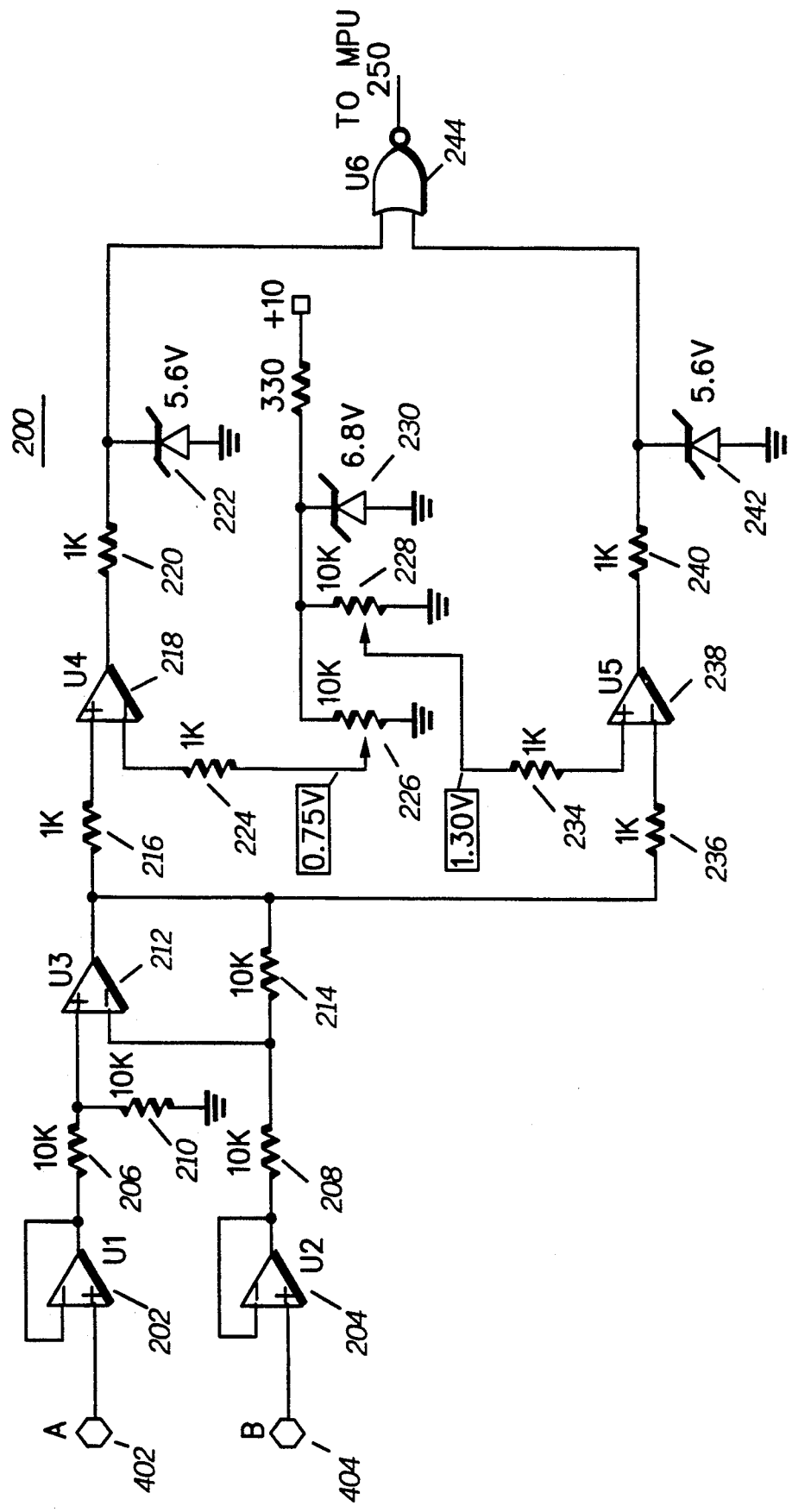
FIG. 2 shows a detector circuit in accordance with the present invention.

Referring now to FIG. 2, there is shown a schematic diagram of a detector circuit 200. The circuit comprises of two comparators U4 and U5, two emitter followers U1 and U2, a summer U3, a NOR gate U6, and their supporting circuits. The inputs of the circuit are A and B from FIG. 4, while the output is C to a processor not shown here for simplicity.

The A input 402 is buffered by the emitter follower 202 and divided by two via the two resistors 206 and 210 that form a divider network. The resultant signal is applied to the non-inverting input of the summer 212. The B input 404 is buffered by the emitter follower 204 and applied to the inverting input of the summer 212 via resistor 208. Resistor 214 provides a negative feed back to the summer 212. The operation of emitter followers and summers is well known to those skilled in the art. One can easily calculate the output of the summer 212 and conclude that it is the difference of the two input signals A and B (A-B).

Resistors 216 and 236 couple the output signal of U3 summer 212 to the inverting input of U4 comparator 218 and the non-inverting input of U5 comparator 238 respectively. Resistors 226, 228, and 232 along with the zener diode 230 form a voltage reference source for U4 and U5 comparators 218 and 238. Resistors 226 and 228 are shown as potentiameter so as to provide adjustability to the reference voltage. The reference signal from potentiameter 226 is routed to the non-inverting input of U4 comparator 218 via resistor 224. Similarly the reference signal from potentiameter 228 is routed to the inverting input of U5 comparator 238 via resistor 234. In this example with the values assigned the circuit components as seen on FIG. 2 the reference voltage at U4 and U5 comparators 218 and 238 are 0.75 V and 1.30 V respectively.

The output signal of U4 comparator 218 is coupled to the first input of U6 NOR gate 244 after being limited by a limiter circuit consisting of a resistor 220 and a diode 222. Similarly the output signal of U5 comparator 238 is coupled to the second input of U6 NOR gate 244 after being limited by a limiter circuit consisting of a resistor 240 and a diode 242. U6 NOR gate 244 processes the output signals from the comparators 218 and 238 and determines the coupling status of the antenna coupler 410. The output of U6 NOR gate 244 is interfaced to the MPU 250. A flag bit in the MPU 250 is subsequently set or cleared in response to the signal arriving from U6 NOR gate 244. The MPU 250 which is continuously compiling location data, received from location sensor 414, combines the coupling status of the antenna coupler 410 and the latest location information to produce the packet 300. This packet 300 is then routed from the MPU 250 to the radio interface 416 to the mobile transceiver 118.

In the event that the antenna 114 is decoupled or shorted to the ground plane due to act of nature, sabotage, or any other event, a variation in the bias current demand by the antenna coupler 410 will force the voltage across the resistor 406 to change beyond the boundaries set by the potentiometers 226 and 228. This voltage variance is detected by U4 and U5 comparators 218 and 238. The outputs of U4 and U5 comparators 218 and 238 change states accordingly forcing the output of U6 NOR gate 244 to change state as an indication that a decoupling of the antenna 114 has occurred. The output of U6 NOR gate 244 indicates to the MPU 250 the latest coupling status of the antenna coupler 410. This indication sets or clears a flag bit of a register of the MPU 250 accordingly. The MPU 250 which compiles the data packet 300 periodically, combines this flag bit along with coordinate information, speed, direction, and signal quality in to the data packet 300. The data packet 300 is routed from the MPU 250 to the radio interface 416. The radio interface 416 subsequently routes the data packet 300 along with protocol information to the mobile transceiver 118 for transmission to the dispatch sub-system 100A. At the dispatch sub-system 100A the dispatch attendant is notified of the latest coupling status on his computer monitor 1062 via the screen display 600 column 602. The dispatch attendant proceeds to take one of several actions such as; not relying on the location information sent in by the AVL, and rather requesting it from the operator of the vehicle. The information on the coupling status of the antenna coupler 410 is very helpful in the maintenance of vehicles in a fleet. The maintenance technician is informed of specific antenna coupling problems before any troubleshooting is conducted.

Those skilled in the art appreciate the use of other detector circuits in detecting the coupling status of two circuits specifically antennas and receivers. The detector circuit 200 is presented here as a preferred embodiment and shall not be construed as a limitation to the present invention.

What is claimed is:

1. In a communication system having a plurality of transmitters for transmitting signals with pre-determined time intervals, also having a plurality of vehicles each having an antenna coupled to a receiver via an active transformation device being biased by a supply current from said receiver, said receiver intended for receiving and decoding said signals with pre-determined time intervals, a processor coupled to said receiver for processing said signals with pre-determined time intervals to determine geographical location of said plurality of vehicles, a transceiver coupled to said processor for transmitting signals containing said geographical location of said plurality of vehicles to a dispatch center, comprising:

a circuit for analyzing the coupling status of said receiver to said antenna, comprising:

measurement means for measuring said bias current;

comparator means coupled to said measurement means for comparing said bias current to pre-determined levels of current levels for determining the coupling status of said antenna to said receiver; and indicator means coupled to said comparator means for indicating said coupling status of said antenna to said receiver to said transceiver.

2. The circuit of claim 1, further including:

processor means for processing the result of said comparator means;

3. The circuit of claim 2, wherein:

said measurement means includes a current to voltage converter.

4. The circuit of claim 3, wherein:

said current to voltage converter is a resistor.

5. The circuit of claim 2, wherein:

said processor means includes setting or clearing of a flag bit in a micro-processor in response to said coupling status of said antenna.

6. The circuit of claim 1, wherein:

said indicator means includes a display at said dispatch center.

* * * * *